Sept. 14, 1965  F. V. ATKESON  3,206,293
METHOD AND APPARATUS FOR DRAWING GLASS SHEETS
Filed May 12, 1961  2 Sheets-Sheet 1

INVENTOR.
FLORIAN V. ATKESON
BY
Oscar L. Spencer
ATTORNEY

Sept. 14, 1965  F. V. ATKESON  3,206,293
METHOD AND APPARATUS FOR DRAWING GLASS SHEETS
Filed May 12, 1961  2 Sheets-Sheet 2

INVENTOR.
FLORIAN V. ATKESON
BY Oscar L. Spencer
ATTORNEY

United States Patent Office

3,206,293
Patented Sept. 14, 1965

3,206,293
METHOD AND APPARATUS FOR DRAWING
GLASS SHEETS
Florian V. Atkeson, Springdale, Pa., assignor to Pittsburgh Plate Glass Company, Pittsburgh, Pa., a corporation of Pennsylvania
Filed May 12, 1961, Ser. No. 110,842
3 Claims. (Cl. 65—84)

This application is a continuation-in-part or my copending application, Serial No. 599,136, filed July 20, 1956, now abandoned.

The present invention relates to improvements in drawing sheet glass and particularly concerns a method and apparatus designed to minimize temporary warp in a ribbon of drawn glass during drawing and to produce a sheet having optimum flatness.

When sheet glass is drawn in a sheet glass drawing machine from a bath of molten glass, the glass sheet is formed within a drawing kiln or chamber which is substantially completely enclosed except for a slot at its top. This slot is of sufficient dimensions to permit the glass sheet to pass in the form of a continuous ribbon. The surfaces of the glass ribbon are engaged by rotating asbestos faced rolls which grip the glass ribbon at its surfaces and move it out of the drawing kiln into a drawing machine located above the drawing kiln. In that portion of the drawing machine, which, unlike the drawing kiln, is not enclosed, the opposite surfaces of the glass are guided by additional asbestos faced rolls which bear against the opposite surfaces of the glass sheet as the ribbon moves to a cutting station.

The drawn glass ribbon sometimes contains imperfections such as stones, seeds and blisters. These imperfections must be prevented from coming into pressurized contact with the rolls of a drawing machine in order to avoid fracturing the ribbon and spoiling the contour of the surface of the drawing machine rolls. Therefore, it is necessary that operating personnel tending the drawing machine observe the passage of the ribbon in order to move the rolls from pressurized contact with defective areas of the ribbon whenever the latter pass through the various pairs of opposed rolls in the drawing machine. In addition, it is necessary that workmen have substantially unobstructed access to the ribbon so that they may physically manipulate it during start-ups and so that they may properly control cracks in the ribbon that sometimes run down the center of the ribbon during the drawing operation. This, of course, is not possible if the ribbon and drawing rolls are mechanically or structurally enclosed throughout the height of the drawing machine.

As the glass ribbon moves through the drawing machine, its temperature is decreasing from below the annealing range to above room temperature. This occurs after the ribbon has travelled several feet from the drawing chamber through an enclosed portion of the machine in which the glass is cooled through the annealing range. If the drawing machine is open from this lower portion of the drawing machine to the top of the machine where the glass is cut and removed, to provide access to the ribbon during the drawing process, the ribbon will normally be exposed to erratic currents of cold ambient air. These currents occur for a variety of reasons, such as opening a door or window of the building in which the drawing machines are located. These erratic currents of cold air impinging on the surfaces of the ribbon cool localized areas of the moving ribbon more rapidly than adjacent areas to cause temporary warpage in the ribbon. As the temporarily warped ribbon passes between the opposed drawing machine rolls, considerable breakage of glass occurs when the rolls are brought into pressurized contact with the opposite sides of the temporarily warped ribbon.

The main purpose of the present invention is to isolate the ribbon, in the region where the ribbon is drawn into the open, from erratic drafts of cold ambient air normally present in the building containing the sheet glass drawing machines. This has been accomplished by providing continuous barriers of air substantially parallel and spaced from the major surfaces of the sheet. Both the direction and intensity of the blasts of fluid forming the fluid barriers may be controlled as necessary in order to provide sufficient flow of fluid to inhibit the impingement of currents of cold air on the moving ribbon. The ribbon, after being formed from a molten bath in a drawing chamber, is drawn upwardly through the top of the chamber and into and through a drawing machine by spaced pairs of horizontally disposed drawing rolls. These rolls frictionally engage the major surfaces of the ribbon and, through rotation, draw the continuous ribbon of glass and convey it to a cut-off station several floors above the bath. The drawing machine, which mainly consists of the drawing rolls, supporting superstructure and roll driving means, is preferably enclosed along the upright side portions adjacent the edges of the ribbon by metal end-walls extending from the drawing chamber or kiln to the cut-off station. In accordance with the present invention, continuous fluid barriers parallel to and spaced from the major surfaces of the continuous ribbon enclose the drawing machine along the upright front and back portions thereof. Enclosing the drawn ribbon within fluid blasts has been instrumental in accelerating the rate of cooling of the sheet. At the cut-off station, not only is the glass ribbon flatter than before, but is about 100° F. cooler than previously and therefore easier to handle when the fluid blasts are oriented properly.

A particular embodiment of the present invention is described in conjunction with a set of drawings in order to explain the present invention more fully. It is understood, however, that this description is for the purpose of illustration rather than limitation. Reference to the latter may be had from the claims accompanying this disclosure.

In the drawings wherein like reference numbers refer to like elements:

Figure 1:
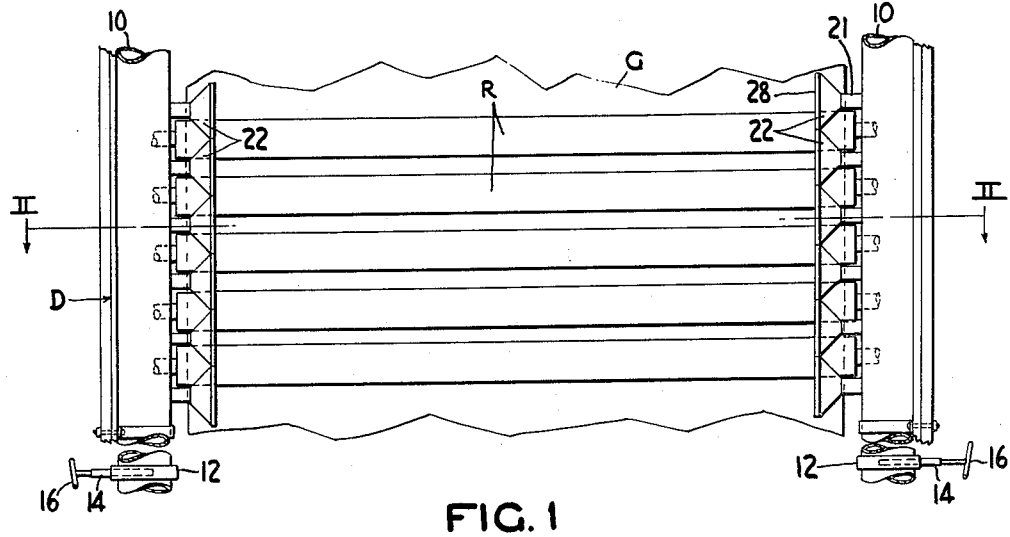
FIGURE 1 is a front elevational view of a portion of a sheet glass drawing machine showing, schematically, means for performing the present invention.
Figure 2:
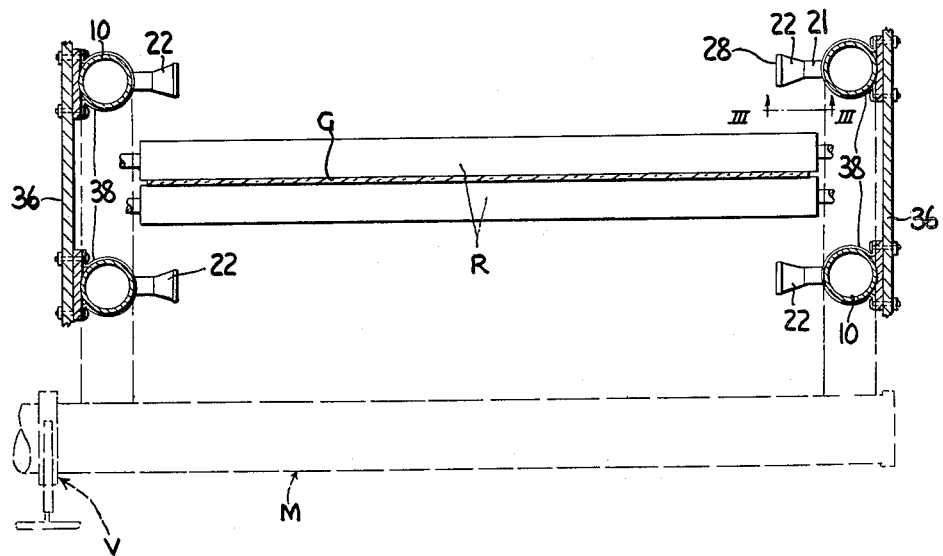
FIGURE 2 is a cross sectional view along the lines II—II of FIGURE 1.

Referring to the drawings, a portion of a drawing machine generally depicted by D is shown in various views in FIGURES 1 and 2. The portion of the drawing machine shown is a zone wherein an exposed glass ribbon G is moved between rolls R driven by mechanism such as depicted in U.S. Patent No. 2,300,522 to Joseph H. Redshaw. The details of the driving mechanism have been omitted from the drawings to facilitate the understanding of the present invention.

In this zone of the drawing machine, the glass temperature has been reduced to below the annealing range. Random currents of cold air impinge locally on the exposed glass ribbon, thus causing temporary warpage.

Temporary warpage occurs when temperature differences are established along, across and through the sheet at temperature levels below the annealing range of the glass. Nonuniform cooling establishes stresses within the glass that are relieved by sheet warpage. This warpage remains until the sheet reverts to a uniform temperature pattern. If the warped sheet moves between pressurized rolls before its temperature is equalized, breakage is likely.

The apparatus for providing a fluid curtain inhibiting the introduction of random air currents onto localized portions of the film is the essence of the present invention. The fluid most readily available is air so this invention will be described particularly relative to the provision of a barrier of air surrounding the glass ribbon.

The air barrier is produced by a pump (not shown) which forces air under pressure through a manifold M valved at V to a quartet of main air ducts 10. The main air ducts 10 extend vertically in pairs beyond each end of the drawing machine, more specifically on opposite sides of the path defined by the moving ribbon. A main damper 12 is included in each main air duct to moderate the delivery rate from the air pump. Each main damper 12 has a main damper gate 14 and a handle 16 for controlling the damper aperture.

The main air ducts 10 communicate into a number of passages 21 which are widened to form pyramidal-shaped housings 22. Within the housings are sets of vertically extending louvres 24 and horizontally extending louvres 26. The housings 22 terminate in openings defined by frames 28 in the base of the pyramidal-like housings 22. The frames abut each other to form four sets of vertically extending substantially continuous apertures facing a vertical plane transversely of the main plane of the drawing machine.

Figure 3:
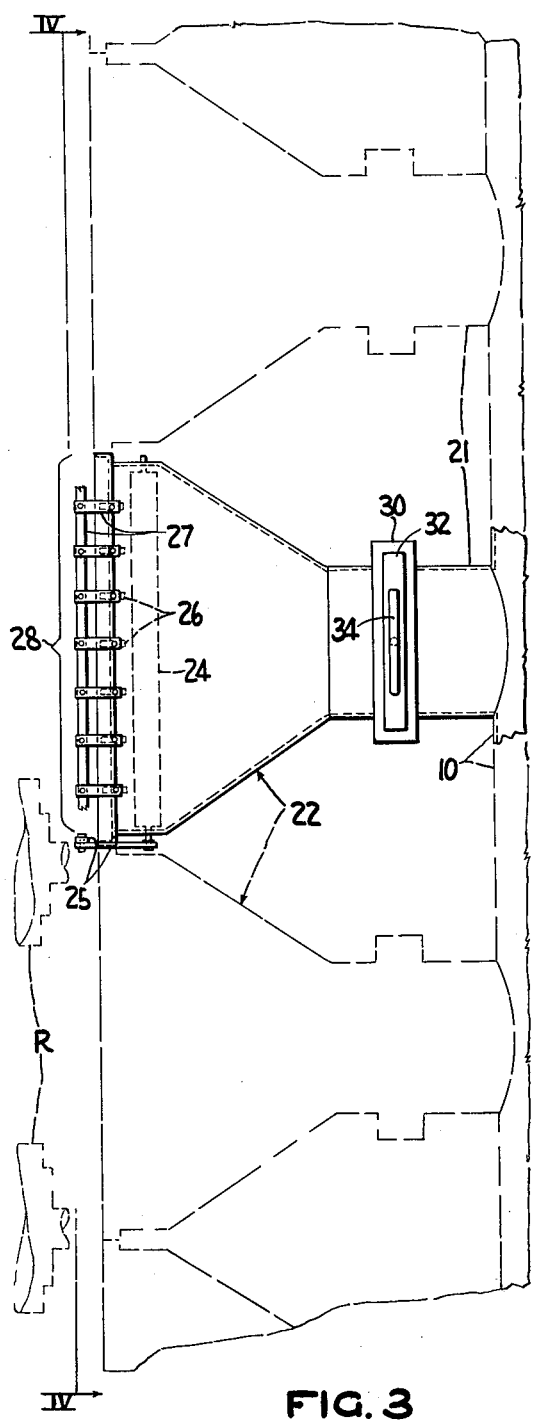
FIGURE 3 is an elevation partially in section taken along the lines III—III of FIGURE 2 with the position of certain rolls shown in phantom in order to depict the location of the preesnt invention relative to a conventional sheet glass drawing machine.
Figure 4:
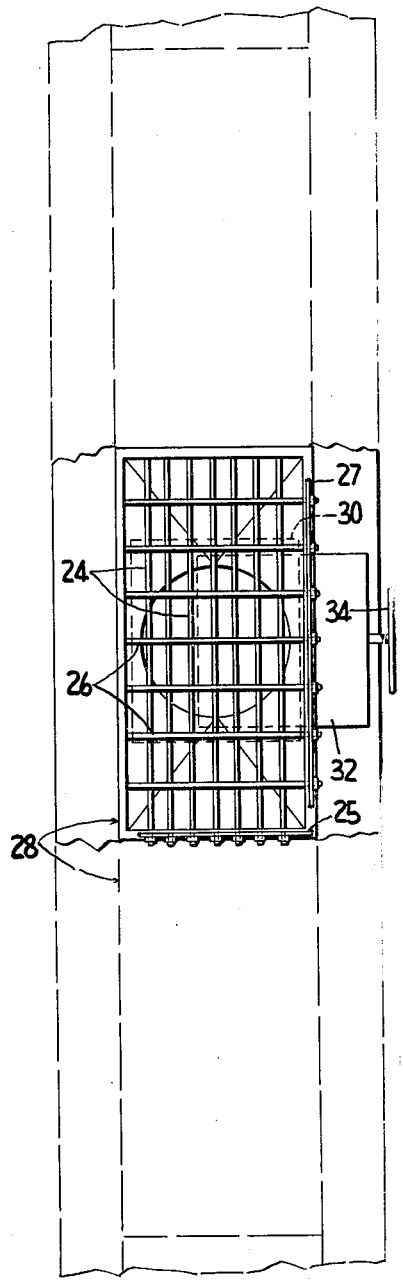
FIGURE 4 is an end view taken along the lines IV—IV of FIGURE 3.

The vertically extending louvres 24 may be rotatable about pivots by means of toggles 25 such as is well known in the louvre art. Individual adjustments may be provided for the louvres of each housing 22, all housings associated with a single air duct 20 may be controlled in concert of each louvre adjusted individually. Similarly, the horizontally extending louvres 26 may be rotatable about pivots by means of toggles 27. Note from FIGURE 3 that the vertical and horizontal louvres are disposed in different planes within the frame 28 of the housing 22. Manipulation of the louvres controls the direction of flow of air from the outlets of the housings 22, louvres 24 controlling its angularity in a horizontal plane and louvres 26 its inclination from the horizontal.

The rate of flow of air through any housing 22 is controlled by providing an individual damper housing 30 in each passage 21. The damper housings 30 each comprise a damper gate 32 and a damper gate handle 34 attached to the damper gate. The damper acts as a gate valve to control the orifice within each passage 21. Increasing the orifice at the damper gate increases the rate of flow of fluid through its associated housing 22.

It has been found preferable to enclose the ends of the drawing machine as well as the glass surfaces from random drafts. This has been accomplished by the provision of removable end walls 36 bolted to attachment straps 38 fixed to opposing main air ducts 10. The removable walls extend across the space between the attachment plates beyond the edges of the drawing machine D. The walls 36 are bolted to facilitate removal in the event it is necessary to adjust the driving mechanism for the rolls R of the drawing machine D. The walls 36 abut each other in end to end vertical relation to provide a pair of opposed vertical end walls.

The louvres are so adjustable that the air blasts emanating therefrom may be directed along paths that are preferably parallel to the major surfaces of the glass ribbon G or form a slight acute angle outwardly therefrom. However, under certain conditions, it may be desirable to direct the air blasts at a slight angle toward the glass sheets to "peel" a hot air blanket from one surface, thereby increasing its cooling rate. This occurs only when there is a drastic imbalance in the cooling rate of the two major surfaces of the glass ribbon.

When the opposite surfaces of a glass ribbon cool at different rates below the annealing range, the surface that is bowed convexly has not been cooled as rapidly as the concave surface. Therefore, it is necessary to adjust the louvres flanking the concave surface to orient the air blasts at a larger angle relative to the major surface of the glass ribbon, adjust the louvres facing the convex surface to orient the air blasts at a smaller angle outwardly of the major surface, or perform a combination of both. For purposes of this discussion, the angle referred to is measured from the major plane of the glass ribbon to the vector of the air blast. Thus, if the air blast is parallel to the plane of the ribbon, the angle is 0, and if an air blast is directed toward the sheet the angle is negative.

The provision of the air barrier on opposite sides of the glass ribbon in the drawing machine can result in improving the cooling rate of the moving ribbon so much that glass ribbon of uniform width and thickness at the same rate of drawing speed that the temperature of the glass ribbon is reduced by up to about 100° F. at the cut-off station from that of the ribbon drawn by the same drawing machine without using an air barrier if the fluid blasts are oriented properly.

Experiments were performed on a regular production drawing machine having a width of 11 feet 9 inches drawing a glass ribbon 98 inches wide. The main air ducts for this machine were 10 inches in diameter arranged in pairs 11 feet 9 inches spaced from centers with the individual main air ducts separated from each other by 80 inches at their center measuring through the plane of the glass ribbon extended. The passages 21 were 4½ inches diameter and spaced 12 inches at their centers. The orifices of housings 22 facing each other on the opposite sides of the drawing machine were separated by 9 feet 9 inches. Under normal operating conditions without the air barrier the temperature of the glass ribbon at the cut-off station ranged from 360° F. to 380° F. across the sheet. By the use of the air barrier the temperature was lowered, in some experiments to a range of 260° F. or 270° F. to 290° F. across the sheet. In general, it was found that if the air from the barrier is directed away from the glass ribbon the average temperature is increased, whereas if the air is directed straight across or slightly toward the ribbon the temperature of the ribbon is decreased. In general, it was also found that a main damper opening of 1 to 5 inches produced satisfactory warp and temperature control.

By virtue of the present invention, a moving fluid barrier is provided that protects the surface of the glass ribbon moving in a drawing machine from localized contacts with random blasts of cool air. The barrier provides an open ended box-like enclosure that encompasses the drawing machine and also promotes accelerated cooling of the glass ribbon.

The air barriers on the opposite sides of the ribbon in accordance with the present invention have another advantage. Each air barrier comprises opposed transverse currents of air that meet and intermix near a plane normal to and at the center line of the ribbon. This intermixing causes a turbulence adjacent the central portion of the surface of the ribbon. This minimizes the normal edge-to-center temperature gradient at the surface of the ribbon so that any crack running down from the upper part of the machine will be diverted toward the edge of the ribbon in the region of the machine that contains the air barrier.

I claim:

1. In a method of making sheet glass, the steps comprising drawing a continuous ribbon of glass from a molten bath, partially cooling a portion of the ribbon to a temperature below its annealing range, thereafter moving the partially cooled portion of the ribbon through a generally open-sided drawing machine, and forming a transverse barrier of gaseous fluid along the open sides of the drawing machine parallel to and spaced from the major surfaces of the partially cooled portion of the continuous ribbon.

2. In apparatus for drawing a continuous glass ribbon along a plane of draw from a bath of molten glass within a drawing kiln, the combination of a drawing machine having spaced pairs of drawings rolls exposed to the ambient atmosphere in an open portion of the machine and extending from one side of the drawing machine transversely of the plane of draw of the glass ribbon to the other side of the drawing machine for drawing the ribbon from the kiln and through the drawing machine, a plurality of neighboring vertically aligned air outlets adjacent each side of the open portion of the drawing machine and on each side of the plane of draw, said outlets being oriented to direct a flow of air spaced from the drawing rolls and plane of draw, and substantially parallel to and transversely of the plane of draw, and means to supply said outlets with pressurized air.

3. In apparatus for drawing a continuous glass ribbon along a plane of draw from a bath of molten glass within a drawing kiln, the combination of a drawing machine having spaced pairs of rolls extending from one side of the drawing machine transversely of the plane of draw of the glass ribbon to the other side of the drawing machine for drawing the ribbon from the kiln and through the drawing machine, said drawing machine and said rolls being exposed to the ambient atmosphere which is characterized by erratic currents of air; fluid discharging means located at each side of the drawing machine adjacent each edge of the ribbon on one side of the plane of draw for forming a substantially continuous fluid barrier along an open portion of the drawing machine, spaced from the rolls, and positioned between the plane of draw and the ambient atmosphere on one side of the plane of draw; and fluid discharging means located at each side of the drawing machine adjacent each edge of the ribbon on the other side of the plane of draw for forming a fluid barrier along an open portion of the drawing machine, spaced from the rolls and position between the plane of draw and the ambient atmosphere on the said other side of the plane of draw; whereby the glass ribbon is protected from erratic currents of the surrounding atmosphere.

References Cited by the Examiner

UNITED STATES PATENTS

| | | | |
|---|---|---|---|
| 2,002,544 | 5/35 | Munro | 65—95 |
| 2,116,693 | 5/38 | Bishop | 65—92 |
| 2,246,053 | 6/41 | Magrini | 65—84 |
| 2,693,052 | 11/54 | Brichard | 65—204 |
| 2,849,837 | 9/58 | Thum et al. | 65—203 |

DONALL H. SYLVESTER, *Primary Examiner.*